United States Patent
Olsson

(10) Patent No.: US 9,677,017 B2
(45) Date of Patent: Jun. 13, 2017

(54) REACTOR, METHOD OF INCREASING THE EFFICIENCY IN A REACTOR AND USE OF THE REACTOR

(71) Applicant: Cassandra Oil Technology AB, Västerås (SE)

(72) Inventor: Anders Olsson, Surrey Surrey (GB)

(73) Assignee: Cassandra Oil Technology AB, Västerås (SE)

( * ) Notice: Subject to any disclaimer, the term of this patent is extended or adjusted under 35 U.S.C. 154(b) by 210 days.

(21) Appl. No.: 14/431,484

(22) PCT Filed: Sep. 27, 2013

(86) PCT No.: PCT/SE2013/051128
§ 371 (c)(1),
(2) Date: Mar. 26, 2015

(87) PCT Pub. No.: WO2014/051514
PCT Pub. Date: Apr. 3, 2014

(65) Prior Publication Data
US 2015/0252273 A1    Sep. 10, 2015

Related U.S. Application Data

(60) Provisional application No. 61/707,083, filed on Sep. 28, 2012.

(30) Foreign Application Priority Data

Sep. 28, 2012 (SE) ........................................ 1251096

(51) Int. Cl.
*C10J 3/32* (2006.01)
*B02C 13/16* (2006.01)
(Continued)

(52) U.S. Cl.
CPC .................. *C10J 3/32* (2013.01); *B02C 13/16* (2013.01); *B02C 13/28* (2013.01); *B29B 17/04* (2013.01);
(Continued)

(58) Field of Classification Search
CPC  C10J 3/32; C10J 3/14; C10J 3/74; C10J 3/22
See application file for complete search history.

(56) References Cited

U.S. PATENT DOCUMENTS 2,735,805 A  *  2/1956  Mora ...................... C10B 53/02
                                                        201/34
3,538,067 A      11/1970  Bognar
(Continued)

FOREIGN PATENT DOCUMENTS

| CN | 101230280 A | 7/2008 |
| WO | WO2011-078779 A1 | 6/2011 |
| WO | WO2011078779 A1 | 6/2011 |

OTHER PUBLICATIONS

Juriga, Mad'ar and M., "A New Method of the Organic Waste Treatment, Concerning Waste Oil, Mixed Plastics Waste, Oil Sludge and PCBS Waste Processing with Simultaneous Recovery of Hydrocarbons", XP003029647, Petroleum and Coal, vol. 45, 3-4, 187-192, 2003 (total 6 pgs.).

(Continued)

*Primary Examiner* — Matthew Merkling
(74) *Attorney, Agent, or Firm* — Barclay Damon, LLP

(57) ABSTRACT

The present invention concerns a reactor (1) for the gasification of organic material included in composite raw material and the separation of gasified organic material from inorganic material included in the composite raw material, the reactor comprising at least one reaction chamber (2) and at least one rotor (3), said reaction chamber (2) comprising at least one housing (6, 6*a*, 6*b*) that is sealed in relation to the surroundings and has at least one inlet opening (8*a*, 8*b*, (Continued)

8c) and at least one outlet opening (9a, 9b) and said rotor (3) comprising at least one shaft (5). Said housing (6, 6a, 6b) is in heat exchanging contact with at least one channel (20) intended to convey gas for heat exchange between the gas and said housing (6, 6a, 6b). Said housing (6, 6a, 6b) is preferably cylindrical and has a primarily circular cross-section in a plane that is primarily perpendicular to a principal direction of extension of said at least one shaft (5), said channel (20) being in contact with at least one-third of the radial external envelope surface of said housing (6, 6a, 6b) and in addition entirely or partly surrounding said at least one inlet opening (8a, 8b, 8c). At least a first part of said rotor (3) is situated in said housing (6, 6a, 6b) and said shaft (5) extends in only one direction from said first part through and out of said housing (6, 6a, 6b). The present invention also concerns a method of increasing the efficiency in the reactor (1) and the use of the reactor (1).

41 Claims, 4 Drawing Sheets

(51) Int. Cl.
| | |
|---|---|
| B02C 13/28 | (2006.01) |
| C10B 47/18 | (2006.01) |
| C10B 53/00 | (2006.01) |
| C10B 53/02 | (2006.01) |
| C10B 53/07 | (2006.01) |
| B29B 17/04 | (2006.01) |
| C01B 3/22 | (2006.01) |
| C10J 3/14 | (2006.01) |
| C10J 3/74 | (2006.01) |
| F23G 5/027 | (2006.01) |
| B29L 30/00 | (2006.01) |
| B29K 67/00 | (2006.01) |
| B29K 77/00 | (2006.01) |

(52) U.S. Cl.
CPC ............... *C01B 3/22* (2013.01); *C10B 47/18* (2013.01); *C10B 53/00* (2013.01); *C10B 53/02* (2013.01); *C10B 53/07* (2013.01); *C10J 3/14* (2013.01); *C10J 3/74* (2013.01); *F23G 5/0276* (2013.01); *B29B 2017/0496* (2013.01); *B29K 2067/00* (2013.01); *B29K 2077/00* (2013.01); *B29L 2030/00* (2013.01); *C01B 2203/0266* (2013.01); *C01B 2203/0827* (2013.01); *C01B 2203/84* (2013.01); *C10J 2200/09* (2013.01); *C10J 2300/092* (2013.01); *C10J 2300/0916* (2013.01); *C10J 2300/0923* (2013.01); *C10J 2300/0946* (2013.01); *C10J 2300/1215* (2013.01); *Y02E 50/14* (2013.01); *Y02P 20/143* (2015.11); *Y02W 30/625* (2015.05)

(56) References Cited

U.S. PATENT DOCUMENTS

| | | | | |
|---|---|---|---|---|
| 3,855,071 | A * | 12/1974 | Koppelman | C10B 1/04 201/34 |
| 4,069,107 | A * | 1/1978 | Koppelman | C01B 31/086 201/12 |
| 4,306,506 | A * | 12/1981 | Rotter | C10J 3/26 110/229 |
| 4,309,195 | A * | 1/1982 | Rotter | C10J 3/26 48/111 |
| 4,481,014 | A * | 11/1984 | Dorling | C10J 3/485 122/235.26 |
| 5,026,403 | A * | 6/1991 | Michel-Kim | C10J 3/02 48/203 |
| 2007/0003459 | A1* | 1/2007 | Stadlbauer | C10B 7/10 422/219 |
| 2008/0196308 | A1 | 8/2008 | Hutton et al. | |
| 2011/0250635 | A1 | 10/2011 | Paz Briz et al. | |
| 2013/0097928 | A1* | 4/2013 | Schwarz | C10J 3/06 48/87 |

OTHER PUBLICATIONS (ISA/SE) Swedish Patent and Registration Office, International Search Report and Written Opinion from PCT/SE2013/051128 as completed Dec. 20, 2013 (total 5 pages).
State Intellectual Property Office (SIPO), Office Action from corresponding Chinese Patent Application No. CN 200810018551.5 filed Feb. 29, 2008 as published under CN publication No. CN101230280A, dated Apr. 25, 2016.

* cited by examiner

REACTOR, METHOD OF INCREASING THE EFFICIENCY IN A REACTOR AND USE OF THE REACTOR

CROSS-REFERENCE TO RELATED APPLICATIONS

This application is a national stage application under 35 U.S.C. §371 of PCT/SE2013/051128 filed Sep. 27, 2013, which claims priority of SE 1251096-2, filed Sep. 28, 2012, and U.S. Provisional Patent Application No. 61/707,083, filed Sep. 28, 2012, each of these documents being hereby incorporated by reference in their entirety.

The present invention concerns a reactor for the gasification of organic material included in composite raw material and the separation of gasified organic material from inorganic material included in the composite raw material, the reactor comprising at least one reaction chamber and at least one rotor, said reaction chamber comprising at least one housing that is sealed in relation to the surroundings and has at least one inlet opening and at least one outlet opening, and said rotor comprising at least one shaft. The present invention also concerns a method of increasing the efficiency in the reactor. The present invention also concerns use of the reactor.

PRIOR ART

SE, C2, 534 399 shows a reactor of the type described by way of introduction. At least a first part of the rotor is situated in the housing and the shaft extends in only one direction from said first part through and out of the housing. However, the construction is not at optimum as regards providing conditions for a process with a high efficiency.

SUMMARY OF THE INVENTION

A first object of the present invention is to provide a reactor for the separation of material included in composite raw material and which by its structure provides conditions for a process having a higher efficiency than previously. A second object of the present invention is to provide a reactor for the separation of material included in composite raw material and which by its structure provides conditions for an all-round use. A third object of the present invention is to provide a method of increasing the efficiency in a reactor for the separation of material included in composite raw material. A fourth object of the present invention is to provide a use of the reactor.

Thus, the invention embraces a reactor for the gasification of organic material included in composite raw material and the separation of gasified organic material from inorganic material included in the composite raw material, the reactor comprising at least one reaction chamber and at least one rotor, said reaction chamber comprising at least one housing that is sealed in relation to the surroundings and has at least one inlet opening and at least one outlet opening, and said rotor comprising at least one shaft. Said housing is in heat exchanging contact with at least one channel intended to convey gas for heat exchange between the gas and said housing. Said housing is preferably cylindrical and has a primarily circular cross-section in a plane that is primarily perpendicular to a principal direction of extension of said at least one shaft, said channel being in contact with at least one-third of the radial external envelope surface of said housing and in addition entirely or partly surrounding said at least one inlet opening. At least a first part of said rotor is situated in said housing and said shaft extends in only one direction from said first part through and out of said housing.

Said housing may be in heat exchanging contact on its outside with said at least one channel. Said at least one channel may be open toward the outside of said housing for enabling direct heat exchange between the gas and said housing. Said at least one channel may be closed against the outside of said housing in order to only allow indirect heat exchange between the gas and said housing. Said channel may be in contact with at least one quarter of the outer surface of said housing. Said channel may be in contact with at least half of the outer surface of said housing. Said channel may be in contact with at least three fourths of the outer surface of said housing. Said channel may be in contact with preferably the entire outer surface of said housing.

At least one support device may act together on a portion of said shaft being outside said housing, alternatively on an additional shaft joined to said portion, said support device entirely supporting the reactor. At least one support device may act together on a portion of said shaft being outside said jacket, alternatively on an additional shaft joined to said portion, said support device partly supporting the reactor. Said shaft may be carried in bearings in at least two planes that extend primarily perpendicular to a principal direction of extension of said shaft, and where said planes are situated outside said housing. Said support device may comprise at least one stand. Said support device may comprise at least two bearings for the bearing mounting of said shaft in said planes. Said support device may comprise at least one bearing housing.

Said housing may have a primarily cylindrical shape. Said jacket may have at least one dismountable part. Said dismountable part may be attached to a remainder of said housing by screw joints and/or bolt joints. Said dismountable part may be internally provided with wear-resistant material. Said housing may be sealed in such a way that exchange of gas between said reaction chamber and the surroundings is primarily prevented.

The remainder of said housing may be attached to at least one of said at least one bearing housing and be supported entirely by this/these. The remainder of said housing may be attached to at least one of said at least one bearing housing and be supported partly by this/these. The remainder of said housing may be attached to at least one of said at least two bearings and be supported entirely by this/these. The remainder of said housing may be attached to at least one of said at least two bearings and be supported partly by this/these. The remainder of said housing may be attached to at least one of said at least one stand and be supported entirely by this/these. The remainder of said housing may be attached to at least one of said at least one stand and be supported partly by this/these.

Said first part of said rotor may comprise at least one hammer. At least one of said hammers may comprise at least one fixed part and at least one articulated part. Said fixed part may be fixedly attached to said first part of said rotor and said articulated part may be articulately attached to said fixed part. Said articulated part may have a centre of gravity that is lying on a first radius r1 of said rotor at the same time as an axis of rotation for the rotation between said articulated part and said fixed part is lying on a second radius r2 of said rotor, said first radius r1 trailing said second radius r2 upon rotation of said rotor in connection with operation of the reactor. Upon rotation of said rotor in connection with operation of the reactor, for each hammer, there may arise a force F2 in the direction of rotation that is proportional to a mass m of said articulated part of the hammer, a perpendicular distance l1 between said first radius r1 and said axis of rotation, and a speed of rotation v1 squared of said centre of gravity, as well as inversely proportional to an effective length l2 of the hammer, and a radius r1 from the centre of said rotor to said centre of gravity.

Thus, the invention also embraces a method of increasing the efficiency in the reactor according to the above for the gasification of organic material included in composite raw material and the separation of gasified organic material from inorganic material included in the composite raw material, the method comprising the steps of collecting combustible gas formed upon the separation in a reaction chamber in a housing that is sealed in relation to the surroundings and provided with at least one inlet opening and bringing the gas to a combustion device, combusting the gas, conveying the burnt gas to at least one channel that is in heat exchanging contact with said housing and in addition entirely or partly surrounds said at least one inlet opening for heat exchange between the burnt gas and said housing, the burnt gas holding a temperature of approx. 1500° C. when it enters into said channel.

The burnt gas may be conveyed to at least one channel that is in contact with the outside of said housing. Surplus energy in the form of hot gas from another available source may be conveyed to said at least one channel. Said second available source may be an internal combustion engine and/or turbine the exhaust fumes of which are conveyed to said at least one channel.

Gas formed upon the separation in the reaction chamber may be brought to at least one scrubber or the like. At least one of said at least one scrubber may be of venturi type, wherein there is vacuum in at least a part of the reaction chamber. The separation in the reaction chamber may take place at a pressure that on average is lower than 0.1 MPa.

Thus, the invention also embraces use of the reactor according to the above for the gasification of organic material included in composite raw material and the separation of gasified organic material from inorganic material included in the composite raw material.

The raw material may be tyres for cars and/or other vehicles. The raw material may be plastic. The raw material may be oil. The raw material may be nylon. The raw material may be polyester. The raw material may be digested sludge. The raw material may be wood. The raw material may be slaughterhouse waste. The raw material may be oil plants.

LIST OF FIGURES

DESCRIPTION OF EMBODIMENTS

Figure 1:
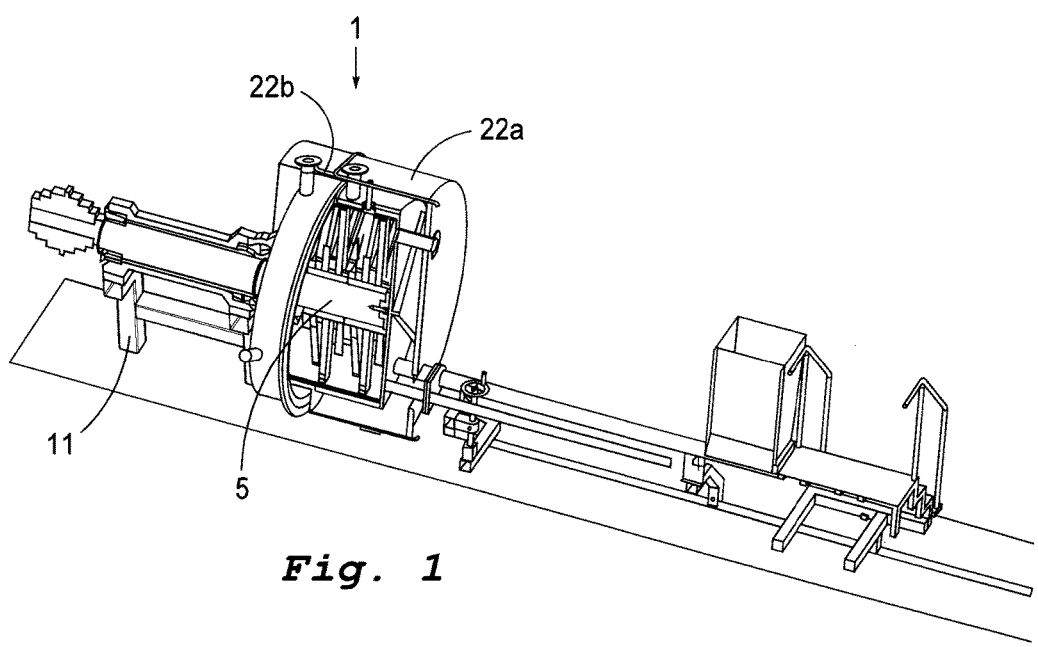
FIG. 1 shows, in a partly sectioned perspective view, a reactor according to the invention having peripheral equipment.
Figure 2:
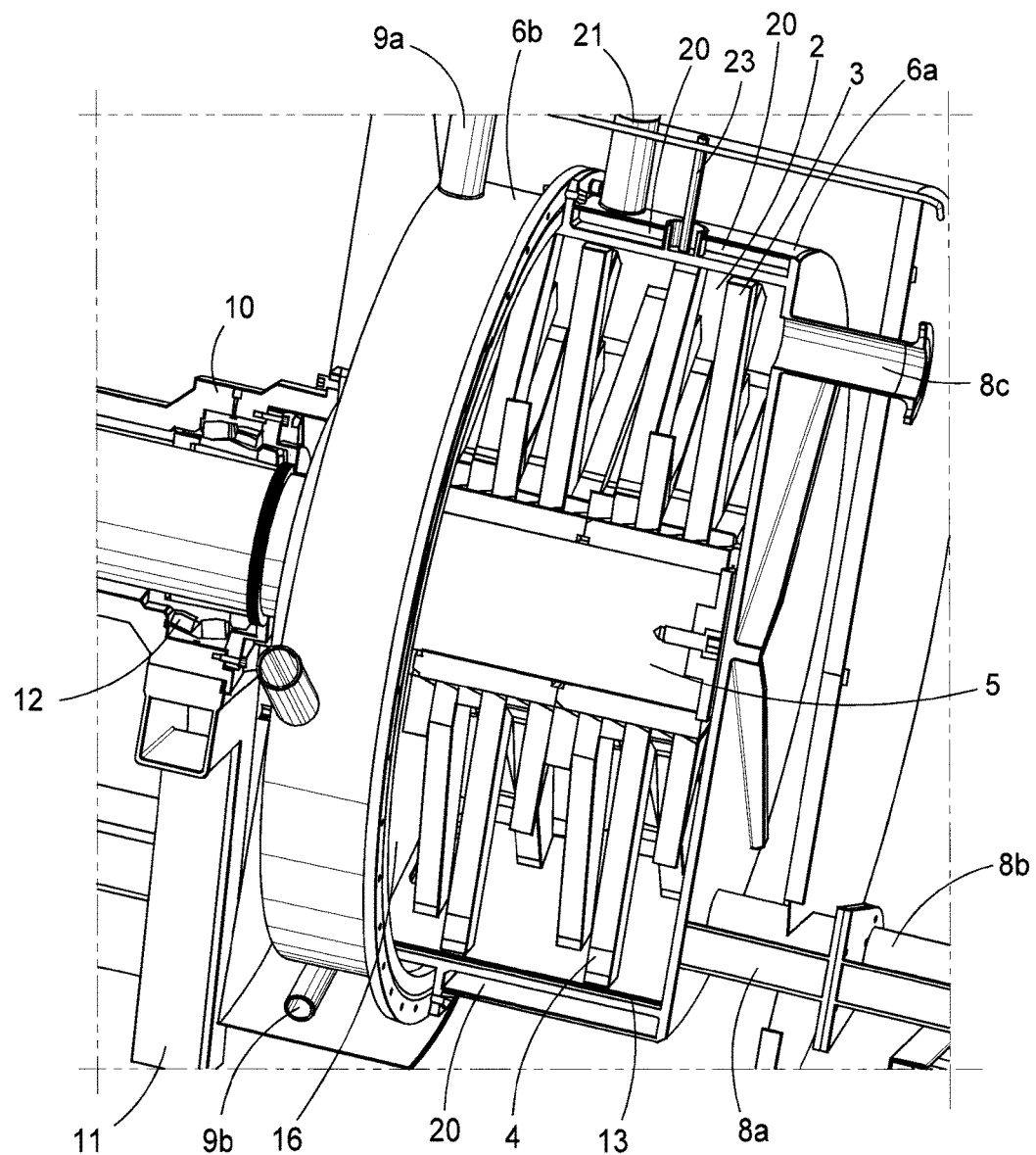
FIG. 2 shows, in a partly sectioned perspective view, a part of the reactor in FIG. 1.

In FIGS. 1 and 2, it is seen how a reactor according to the invention looks. The reactor 1 comprises a reaction chamber 2 and a rotor 3 that is located at least partly in the same and has hammers 4 mounted on a rotor shaft 5. The reaction chamber 2 is surrounded by a housing 6 consisting of two parts, namely a first part 6a and a second part 6b. The first part 6a has one or more inlet openings 8a, 8b, 8c for raw material to the reactor and the second part 6b has one or more outlet openings 9a, 9b for products from the reactor. The housing 6, 6a, 6b is primarily cylindrical and the first part 6a as well as the second part 6b is provided with a mating circumferential flange having a first diameter for a common bolt joint.

Figure 3:
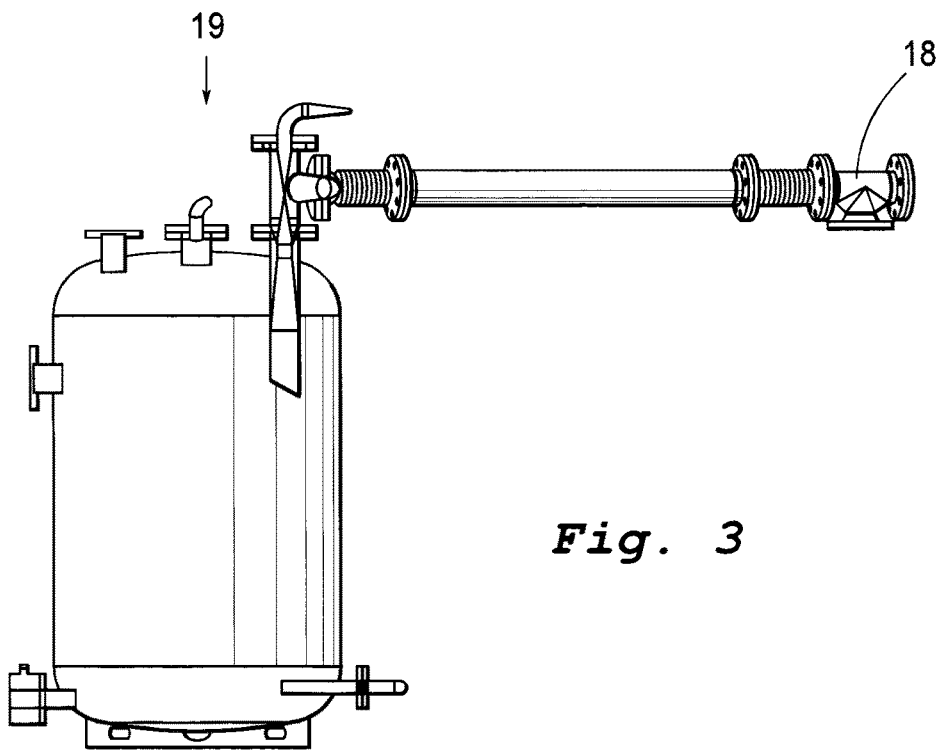
FIG. 3 shows, in a partly sectioned side view, an eductor that may be connected to the reactor in FIG. 1.

In an analogous way, in a second end, the second part 6b connects to a bearing housing 10, the second part 6b as well as the bearing housing 10 being provided with a mating circumferential flange having a second diameter for a common bolt joint. The first diameter is greater than the second diameter. The bearing housing 10 is in turn supported by a stand 11 and accommodates two bearings 12 for the bearing mounting of the rotor shaft 5 where the same extends outside the reaction chamber 2, i.e., only on one side of the reaction chamber 2, the stand 11 accordingly supporting the entire reactor 1. A covering 13 having a wear-resistant material such as steel or ceramic material is present on the inside of the first part 6a. In the second part 6b, there is present an inner wall 16—primarily parallel to the primarily circular end surface of the second part 6b and at a certain distance from the same—and that allows gas to pass through the centre of said wall 16—i.e., between the wall 16 and the rotor shaft 5—to an inner/rear space (not shown) in the reaction chamber 2 from where the gas can continue out of the reactor through an outlet opening 9a of the mentioned outlet openings 9a, 9b and further to an inlet channel 18 of an eductor 19, see FIG. 3, or a distillation unit (not shown) or a condensation unit (not shown) or directly for combustion in an engine (not shown) or heating system (not shown). Solid particles may leave the reactor through another outlet opening 9b of the mentioned outlet openings 9a, 9b.

The reaction chamber 2 is, apart from occurring inlet openings 8a, 8b, 8c and outlet openings 9a, 9b, separated from the surroundings, i.e., the housing 6, 6a, 6b and occurring connection to said bearing housing 10 comprising occurring seal at shaft bushing of the rotor shaft 5 are in other respects to be considered as primarily gas-tight in relation to the surroundings. In this way, the reaction chamber 2 and the reactor 1 differ from usual hammer mills, which are more or less open toward the surroundings.

The housing 6, 6a, 6b is in heat exchanging contact with a channel 20 intended to convey gas for heat exchange between the gas and the housing 6, 6a, 6b. The channel 20 surrounds the greater part of the cylindrical outer surface—however not the primarily circular end surface—of the first part 6a of the housing 6, 6a, 6b, an inlet opening (not shown) for heat exchanging gas being present in a lower part of the channel 20 and an outlet opening 21 for heat exchanging gas being present in an upper part of the channel 20. It is feasible to correspondingly let the channel 20 entirely or partly surround also the end surface of the first part 6a of the housing 6, 6a, 6b. It is feasible to correspondingly let the channel 20 entirely or partly surround also one or more of the inlet openings 8a, 8b, 8c for the raw material—however primarily the inlet opening 8a for the raw material in the form of tyres and/or plastic and/or oil and/or nylon and/or polyester and/or digested sludge and/or wood and/or slaughterhouse waste and/or oil plants and/or the like and the inlet opening 8b for sand and/or catalyst and/or the like. It is feasible to correspondingly let the channel 20 entirely or partly surround also one or more of occurring inlet channels to the inlet openings 8a, 8b, 8c.

An extra casing 22, 22a, 22b is present around the housing 6, 6a, 6b, also this for practical reasons being divided into a first part 22a and a second part 22b. The casing 22, 22a, 22b is primarily cylindrical and the first part 22a as well as the second part 22b is provided with a mating circumferential flange having a third diameter for a common mechanical joint. The third diameter is greater than the first diameter. Supporting stays 23 are present between the casing 22, 22a, 22b and the housing 6, 6a, 6b. In the space between the casing 22, 22a, 22b and the housing 6, 6a, 6b, there is Insulating material. The casing 22, 22a, 22b is made from stainless steel but also other suitable metals and/or materials may occur.

Figure 4:
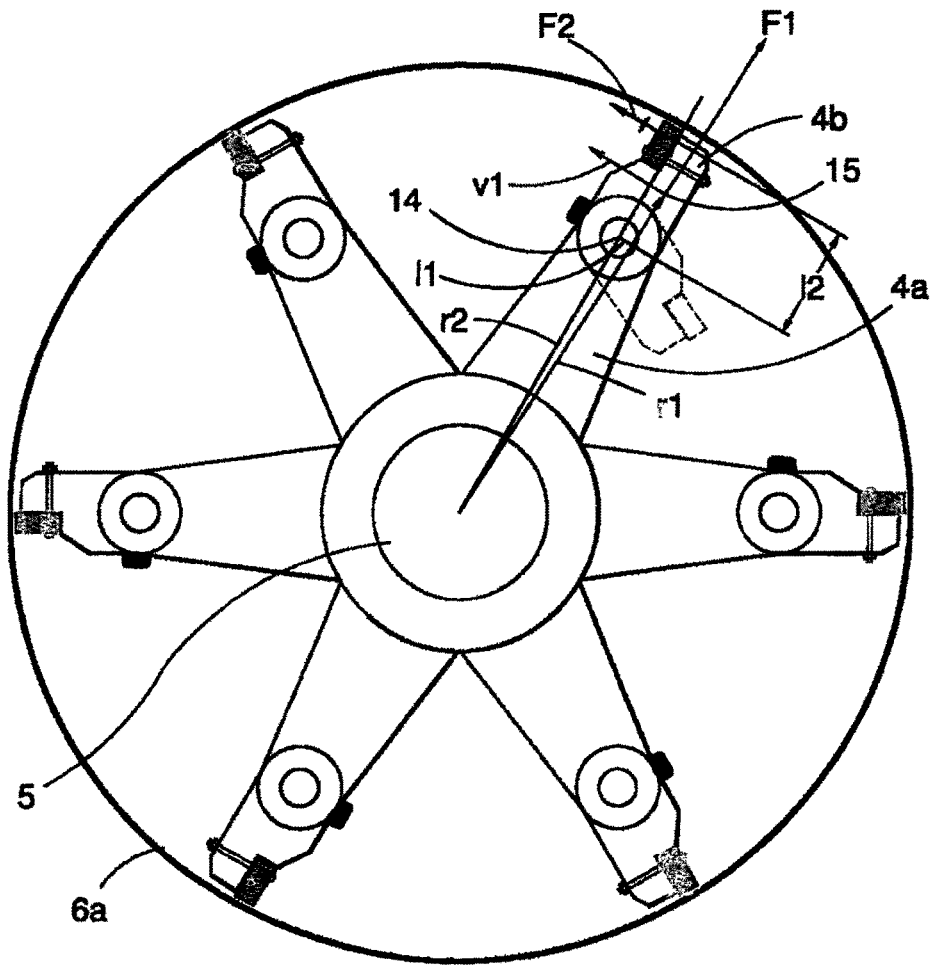
FIG. 4 shows, in a partly sectioned front view, a housing and a part of a rotor that may be included in the reactor in FIG. 1.

The rotor 3 in FIGS. 1 and 2 has hammers 4 of simpler type. In FIG. 4, it is seen how a part of an alternative rotor 3 may look. Here, the rotor shaft 5 is in the same plane provided with six hammers 4 but the number of hammers in the same plane may vary, each hammer 4 consisting of a fixed part 4a and an articulated part 4b. The articulated part 4b is pivoted around an axis 14 that extends primarily parallel to the principal direction of extension of the rotor shaft 5. When the rotor 3 rotates—anti-clockwise in the figure—the articulated part 4b has a centre of gravity 15 that is lying on a first radius r1 of said rotor at the same time as the axis 14 for the rotation between the articulated part 4b and the fixed part 4a is lying on a second radius r2 of said rotor, said first radius r1 trailing said second radius r2 in the rotation, i.e., said first radius r1 forming an angle with said second radius r2. For each hammer, then a force F2 arises in the direction of rotation that is proportional to a mass m of said articulated part 4b of the hammer, a perpendicular distance l1 between said first radius r1 and said axis of rotation 14, and a speed of rotation v1 squared of said centre of gravity 15, as well as inversely proportional to an effective length l2 of the hammer, and a radius r1 from the centre of said rotor to said centre of gravity 15.

By the effective length l2 of the hammer, reference is made to a perpendicular distance between the force F2 and said axis of rotation 14. The force F2 attacks in the central point (the centre of mass) of the material accumulated on the hammer and which the force F2 should work against.

Thus, a desired power per hammer can be calculated and set by predetermining the parameters listed above. Occurring torque will hold each hammer in the predetermined place—against a stop for each hammer (not shown)—by the determined force F2, and if it is exceeded because of too much material being fed into the reactor or because of some heavier impurity having entered into the reactor, the articulated part 4b bends rearward and lets the material pass until equilibrium of forces arises again. This function provides a levelling effect during normal operation and protection against breakdown if, for instance, foreign objects would accompany the material to be processed.

In use of the reactor, raw material is brought in through one or more of occurring inlet openings 8a, 8b, 8c into the reaction chamber 2 where it is decomposed, by the kinetic energy of the hammers 4 of the rotor, as well as by the kinetic energy of particles that are thrown around by the rotary motion of the rotor, and by the heat energy that is created by friction between the hammers 4 and parts of the raw material. Inorganic material in the form of sand, catalysts, steel, glass, etc., may be used to increase the friction and thereby the temperature. The inorganic particles affect the decomposition process favourably by the fact that they have a large total contact surface that acts as an efficient heat exchanger against the raw material, as well as a catalyst for the breaking of hydrocarbon polymers and greater hydrocarbon molecules. Hydrocarbon compounds, water, and other organic material are gasified in the device. The centrifugal forces created by the rotor separate the gas from the heavier inorganic materials, the gas part being brought out of the reactor in the centre thereof and the heavier particles can be tapped at the periphery of the reactor and in both cases through occurring outlet openings 9a, 9b.

In use of the reactor, a method of increasing the efficiency in the reactor is applied, the method comprising the steps of collecting combustible gas formed upon the separation in the reaction chamber 2 in the housing 6, 6a, 6b and bringing the gas to a combustion device, combusting the gas, conveying the burnt gas to at least one channel that is in heat exchanging contact with the housing 6, 6a, 6b for heat exchange between the burnt gas and the housing 6, 6a, 6b. In this way, the efficiency of the process increases. The gas is combusted in a diesel engine but also other engines and/or turbines and/or ways of combusting are feasible. The burnt gas—i.e., exhaust fumes from the diesel engine—is conveyed to the channel 20 that is in contact with the outside of the housing 6, 6a, 6b. The burnt gas holds a temperature of approx. 1500° C. when it enters into the channel 20. Surplus energy in the form of hot gas from another available source may also be conveyed to the channel 20. Other gas formed upon the separation in the reaction chamber 2 is brought to an eductor in the form of a venturi scrubber. This results in there being vacuum in at least a part of the reaction chamber 2 and the separation in the reaction chamber 2 taking place at a pressure that on average is lower than 0.1 MPa, which is highly favourable for the efficiency of the process.

The invention is not limited to the embodiments shown herein, but may be varied within the scope of the subsequent claims.

The invention claimed is:

1. A reactor for the gasification of organic material included in composite raw material and the separation of gasified organic material from inorganic material included in the composite raw material, the reactor comprising:

at least one reaction chamber and at least one rotor;

said at least one reaction chamber comprising:

at least one housing that is sealed in relation to the surroundings and has at least one inlet opening and at least one outlet opening and said rotor comprising at least one shaft, wherein said housing is in heat exchanging contact with at least one channel intended to convey gas for heat exchange between the gas and said housing, wherein said housing is cylindrical and has a primarily circular cross-section in a plane that is primarily perpendicular to a principal direction of extension of said at least one shaft, said channel being in contact with at least one-third of the radial external envelope surface of said housing and in addition entirely or partly surrounding said at least one inlet opening, and that at least a first part of said rotor is situated in said housing and said shaft extends in only one direction from said first part through and out of said housing.

2. The reactor according to claim 1, wherein said housing is in heat exchanging contact on its outside with said at least one channel.

3. The reactor according to claim 1, wherein said at least one channel is open toward the outside of said housing for enabling direct heat exchange between the gas and said housing.

4. The reactor according to claim 1, wherein said at least one channel is closed against the outside of said housing in order to only allow indirect heat exchange between the gas and said housing.

5. The reactor according to claim 1, wherein said channel is in contact with at least one quarter of the outer surface of said housing.

6. The reactor according to claim 1, wherein said channel is in contact with at least half of the outer surface of said housing.

7. The reactor according to claim 1, wherein said channel is in contact with at least three fourths of the outer surface of said housing.

8. The reactor according to claim 1, wherein said channel is in contact with the entire outer surface of said housing.

9. The reactor according to claim 1, wherein at least one support device together acts on a portion of said shaft situated outside said housing, alternatively on an additional shaft joined to said portion, said support device at least partly supporting the reactor.

10. The reactor according to claim 9, wherein said shaft is carried in bearings in at least two planes that extend primarily perpendicular to a principal direction of extension of the shaft and where said planes are situated outside said housing.

11. The reactor according to claim 9, wherein said support device comprises at least one stand.

12. The reactor according to claim 10, wherein said support device comprises at least two bearings for the bearing mounting of said shaft in said planes.

13. The reactor according to claim 9, wherein said support device comprises at least one bearing housing.

14. The reactor according to claim 9, wherein said housing has at least one dismountable part.

15. The reactor according to claim 14, wherein said at least one dismountable part is attached to a remainder of said housing by at least one of screw joints or bolt joints.

16. The reactor according to claim 15, wherein said at least one dismountable part is internally provided with wear-resistant material.

17. The reactor according to claim 1, wherein said housing is sealed in such a way that exchange of gas between said reaction chamber and the surroundings is primarily prevented.

18. The reactor according to claim 15, wherein the support device comprises at least one bearing housing in which the remainder of said housing is attached to at least one of said at least one bearing housing and is supported at least partly thereby.

19. The reactor according to claim 15, wherein the shaft is carried in bearings in at least two planes that extend primarily perpendicular to a principal direction of extension of the shaft and where said planes are situated outside said housing, in which the support device comprises at least two bearings for the bearing mounting of said shaft in said planes, wherein the remainder of said housing is attached to at least one of said at least two bearings and is supported at least partly thereby.

20. The reactor according to claim 15, wherein the support device comprises at least one stand in which the remainder of said housing is attached to at least one of said at least one stand and is supported at least partly thereby.

21. The reactor according to claim 1, wherein said first part of said rotor comprises at least one hammer.

22. The reactor according to claim 21, wherein at least one of said at least one hammer comprises at least one fixed part and at least one articulated part.

23. The reactor according to claim 22, wherein said at least one fixed part is fixedly attached to said first part of said rotor and said at least one articulated part is articulately attached to said fixed part.

24. The reactor according to claim 23, wherein said at least one articulated part has a center of gravity that lies on a first radius of said rotor at the same time as an axis of rotation for the rotation between said at least one articulated part and said at least one fixed part lies on a second radius of said rotor, said first radius trailing said second radius upon rotation of said rotor in connection with operation of the reactor.

25. The reactor according to claim 24, wherein, upon rotation of said rotor in connection with operation of the reactor, for each hammer, there arises a force (F2) in the direction of rotation that is proportional to
 a mass (m) of said articulated part of the hammer,
 a perpendicular distance (l1) between said first radius and said axis of rotation, and
 a speed of rotation (v1) squared of said center of gravity, as well as inversely proportional to
 an effective length (l2) of the hammer, and
 a radius from the center of said rotor to said center of gravity.

26. Method of increasing the efficiency in the reactor according to claim 1 for the gasification of organic material included in composite raw material and the separation of gasified organic material from inorganic material included in the composite raw material, the method comprising the steps of:
 collecting combustible gas formed upon the separation in a reaction chamber in a housing that is sealed in relation to the surroundings and provided with at least one inlet opening and bringing the gas to a combustion device,
 combusting the gas,
 conveying the burnt gas to at least one channel that is in heat exchanging contact with said housing and in addition entirely or partly surrounds said at least one inlet opening for heat exchange between the burnt gas and said housing, the burnt gas holding a temperature of approximately 1500° C. when it enters into said channel.

27. The method according to claim 26, wherein the burnt gas is conveyed to at least one channel that is in contact with the outside of said housing.

28. The method according to claim 26, wherein surplus energy in the form of hot gas from another available source is conveyed to said at least one channel.

29. The method according to claim 28, wherein said second available source is one of an internal combustion engine or a turbine, the exhaust fumes of which are conveyed to said at least one channel.

30. The method according to claim 26, wherein gas formed upon the separation in the reaction chamber is brought to at least one scrubber or the like.

31. The method according to claim 30, wherein at least one of said at least one scrubber is of venturi type, wherein there is vacuum in at least a part of the reaction chamber.

32. The method according to claim 26, wherein the separation in the reaction chamber takes place at a pressure that on average is lower than 0.1 MPa.

33. The reactor according to claim 1, wherein the raw material consists of tires for cars and/or other vehicles.

34. The reactor according to claim 1, wherein the raw material consists of plastic.

35. The reactor according to claim 1, wherein the raw material consists of oil.

36. The reactor according to claim 1, wherein the raw material consists of nylon.

37. The reactor according to claim 1, wherein the raw material consists of polyester.

38. The reactor according to claim 1, wherein the raw material consists of digested sludge.

39. The reactor according to claim 1, wherein the raw material consists of wood.

40. The reactor according to claim 1, wherein the raw material consists of slaughterhouse waste.

41. The reactor according to claim 1, wherein the raw material consists of oil plants.

\* \* \* \* \*